May 2, 1967 W. C. HUGHES ETAL 3,317,104

TAPE INDEXING ARRANGEMENT

Filed May 5, 1965

Inventors:
William C. Hughes
Charles R. Stein
Raymond W. Kunz
by Charles W Helzer
Their Attorney United States Patent Office 3,317,104

Patented May 2, 1967

3,317,104

TAPE INDEXING ARRANGEMENT

William C. Hughes, Scotia, Charles R. Stein, Schenectady, and Raymond W. Kunz, Ballston Lake, N.Y., assignors to General Electric Company, a corporation of New York Filed May 5, 1965, Ser. No. 453,269
6 Claims. (Cl. 226—183)

The present invention relates to tape recorder write/readout guide mechanisms and more specifically to tape guide mechanisms for thermoplastic tapes wherein it is desired to accurately position both the lateral edges of a tape and the front surface of a tape relative to a fixed writing or interrogating means.

When using a light optical system for interrogation of a tape, an interrogating beam of light having an extremely small width, in the micron region, is used. Since the ultimate resolving power of a light optical system is less than the width of this beam, a very good lens must be used. It is also a requirement that this lens be used with a large limiting aperture; therefore, it is required that the focal length of the lens be very shallow. Consequently any variation between the front surface of a thermoplastic tape, wherein the information is stored, and the front surface of the lens will cause a corresponding change in the width of an interrogating beam. Too large an interrogating beam will vary the frequency and amplitude response of the system. Thus, it is desired to maintain the distance between the front surface of the tape and the front surface of the lens a constant. To do this the tape should be "front referenced."

Further, if the lateral position of the tape is allowed to vary, the position of a track of information being interrogated might move in and out of the interrogating beam of light or from a position outside the beam on one side of the track to a position on the other side of the interrogating beam of light. Hence, a sporadic information retrieval, in the first instance, or possibly no information retrieval, in the latter instance, occurs if the lateral position of the information track is allowed to vary. Small curvatures in the tape, which result from a curling of the tape, also cause lateral movement of a track of information being interrogated with similar sporadic retrieval occurring. As the edges of a tape can deviate from a straight line as much as the width of a track of information, to keep the tape in a straight line requires that any deviation be averaged over the distance the tape travels. A further desirable feature of the tape guide mechanism is that it repeatedly positions the tape in the same location relative to a write/readout apparatus in the course of successive operations. Additionally, in order to insure maximum tape life, the means for accurately positioning the tape during interrogation should not touch the thermoplastic area on the front side of the tape nor should it scratch the reverse side of the tape.

Therefore, one object of the present invention is to provide a "front referenced" tape during interrogation thereof.

An object of the present invention is to provide a tape readout guide wherein the front surface of the tape, the surface on which the information is contained, is maintained a constant predetermined distance from an interrogating means during interrogation thereof.

Another object of the present invention is to provide a tape readout guide which accurately positions a tape passing through an interrogating means whereby the positioning means neither touches the information on the tape nor scratches the reverse side thereof.

Still further, an object of the present invention is to provide a tape readout guide mechanism wherein the position of a track of information relative to a fixed interrogating means at the readout station is kept constant so that the interrogating means reads all of the information contained in the track.

Another object of the present invention is to provide a means for averaging short length variations in the width of a tape being interrogated.

A still further object of the invention is to provide a tape guide mechanism for a write/readout station of a recorder mechanism which has good repeatability.

Briefly, a tape is laterally positioned by passing it between spaced means whereupon a force is applied to one edge of the tape so as to force the opposite edge thereof against a reference guide. Further, the tape passes between a fixed means and a movable member during which time interrogation of the tape occurs. The movable member is biased towards the fixed means so that any variation in the thickness of the tape pushes the movable member away from the fixed means. As a result the front side of the tape, on which the information is contained, remains referenced against the fixed means and the distance between the interrogating means and the tape remains a constant. This feature also makes it possible to repeatedly position a tape in the same position during successive runs through the tape guide mechanism.

Additional objects and advantages of the present invention together with a better understanding thereof may be had by referring to the following detailed description of a preferred embodiment of the present invention and the accompanying drawings.

Figures 1, 2:
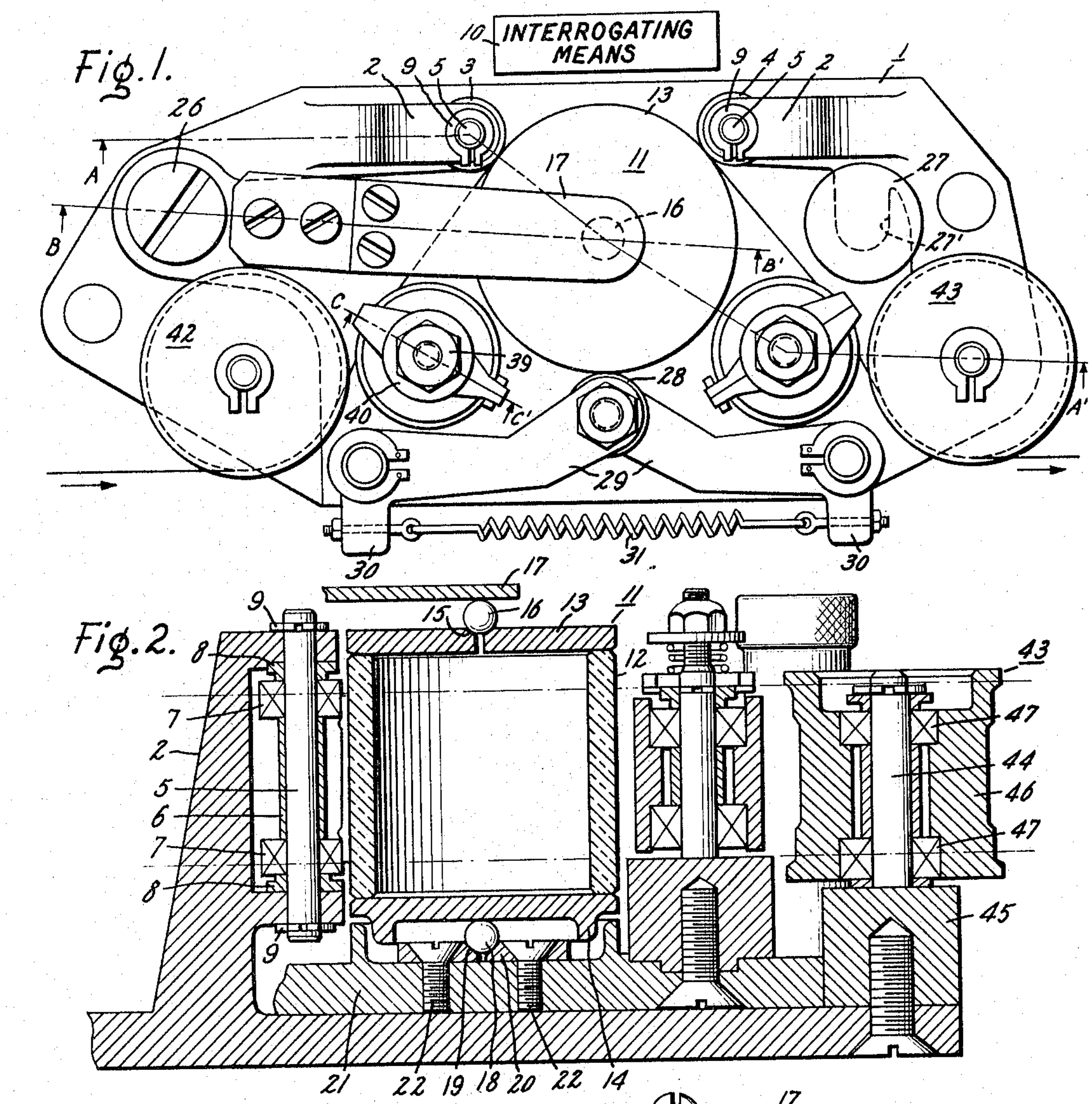
FIGURE 1 is a top view of a preferred embodiment of the present invention.
FIGURE 2 is a sectional view of the preferred embodiment shown in FIGURE 1 taken along the lines A–A′.

Referring now to FIGURES 1 and 2 of the drawings, a preferred embodiment of the tape guide mechanism of the present invention comprises a base 1 having upstanding integral F-shaped supports 2 disposed adjacent one end thereof. Held between the legs of the supports are the means for "front referencing" a tape which means comprise first and second fixed members 3 and 4 each having a shaft 5 disposed in apertures in each of the legs of the supports 2. Attached to each shaft is a central spacer member 6 which separates spaced bearings 7 rotatably mounted on the shaft 5. Additional spacers 8 are disposed between the bearings 7 and the inner surfaces of the legs of the supports 2 so the bearings rotate freely. Retaining rings 9 fit within circumferential slots adjacent the outer ends of shaft and abut the outer surfaces of the legs so as to lock the assembly between the legs of the supports 2.

A writing or interrogating means 10, the specific construction of which forms no part of this invention, may be disposed adjacent the tape between the first and second support members and may be fabricated from magnetic, optical, or other suitable materials.

A cylindrical member 11, over which a tape under tension passes during which time interrogation of the tape occurs, comprises an open ended cylinder 12 having upper 13 and lower 14 closing surfaces. The upper closing surface 13 has a groove 15 in which a ball bearing 16 rides which ball bearing is maintained in the groove by a plate 17 to be described later. The lower closing surface 14 is also mounted on a ball bearing 18 which rides in a groove 19 in a support 20 attached to a base plate 21 by threaded members 22. As both the upper and lower 14 closing surfaces are mounted on ball bearings, the cylinder is rotatable about an axis passing therethrough. If it be desired to use an optical interrogating means, the walls of the cylinder should be made of a transparent material as illustrated in FIGURE 1, so that light energy can pass therethrough. However, in the event that the recording method and tape employed does not require transmission of light through the tape, then the cylinder can be made of steel, etc. This would be particularly desirable if a reflective readout technique is being employed.

Figure 3:
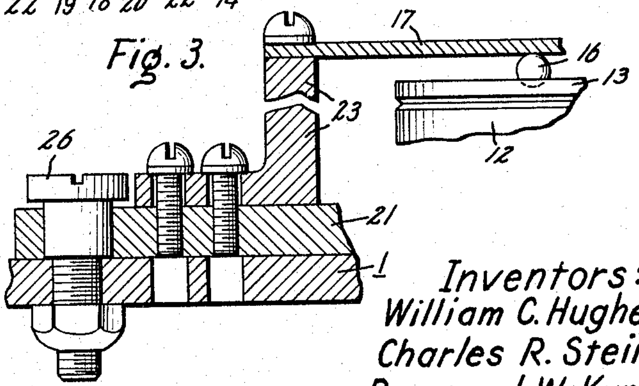
FIGURE 3 is a sectional view taken along the line B–B′ of FIGURE 1.

As previously mentioned, the upper ball bearing 16 is maintained in its groove 15 by a plate 17 which is attached to an L-shaped support member 23 as best seen in FIGURE 3. In turn, the L-shaped support member is attached to the base plate 21. As shown in FIGURE 1, the base plate 21 is attached to the base 1 by means of two threaded members 26 and 27 one of which 27 fits within an open ended slot 27′ on the base plate 21 to permit a small amount of adjustment in positioning the base plate 21 on the base 1.

A means for biasing the cylinder 11 toward the fixed members 3 and 4 comprises a spring loaded bearing 28 mounted between pivoted arms 29 attached to the base plate 21 on the side of the cylinder remote from the fixed members. Each arm has a projecting portion 30 to which a compression spring 31 is connected therebetween. The force of the compression spring 31 pushes the bearing 28 against the cylinder 11 which in turn is pushed toward the fixed members 3 and 4.

Figure 4:
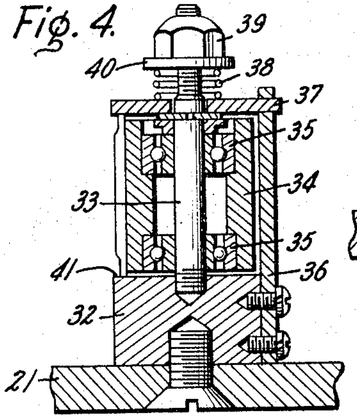
FIGURE 4 is a sectional view taken along the line C–C′ of FIGURE 1.

The lateral positioning means for the tape comprises, as is best shown in FIGURE 4, a pair of spaced means each including a post 32 which is threadedly attached to the base plate 21. A shaft 33 extends vertically from the post 32 and mounted thereon is a cylindrical member 34 which is rotatably connected to the shaft by means of a pair of spaced bearing members 35. Attached to a side wall of the post is a forked member 36 having an ended slot at the upper portion thereof. Mounted about the upper portion of the shaft 33 is a tape guide member 37 having one end fitting within the open ended slot on the fork member so as to prevent rotation thereof. This tape guide member 37 is spring biased toward the base plate by means of an expansion spring 38 which abuts the top surface of the tape guide and is held in this position by a nut 39 and a washer 40 fastened to the shaft. The lower surface of the tape guide engages one end of a tape passing over a portion of the cylinder 34 and pushes it against a lower guide surface 41 on the post to thereby laterally position the tape. As the tape is wound about a portion of the cylindrical members, there is some resistance to a lateral force applied thereto and the tape does not curl or bend in response thereto. It is this feature that provides the tape guide mechanism with the capability of repeatedly positioning a tape in the same position during successive runs of the tape through the guide mechanism.

Feed rollers 42 and 43 comprise a shaft 44 mounted to a post 45 which is threadedly attached to the base 1. A roller 46 is rotatably connected to the shaft by a pair of spaced bearings 47.

In the operation of the present invention, a tape under tension is laterally positioned by passing it between two spaced rollers 34 placed on either side of the interrogating means 10. The tape is passed over a portion of the surface of each roller so as to give it some resistance to a laterally applied force while at the same time a lateral force is applied to one edge of the tape by the tape guide 37 thus forcing the opposite tape edge against the lower guide surface 41. This positioning occurs on each of the spaced rollers 34 and any deviation of the tape edge from a straight line is averaged over the total distance traveled by the tape between the two rollers thereby minimizing any lateral deviation of the track of information to be interrogated and maintaining the track of information substantially in a constant plane. Further, the tape passes about a portion of a central cylindrical member 11, which is disposed between the previously mentioned two rollers, and is spring biased equally against the bearings 7 disposed on each of the fixed means 2. It should be noted that interrogation of the tape occurs at some time while the tape is traveling between the fixed members 2. Any deviation of the thickness of the tape as it passes between the cylindrical member 11 and the fixed bearings 7 pushes the cylindrical member against the spring bias 31 and away from the fixed means, thus maintaining the front of the tape, on which the information is contained, a constant distance from the interrogating means. Further, these bearings touch only the outer edges of the tape and do not touch the thermoplastic area of the tape on which the information is contained. Thus, it is seen that the present invention provides a "front referenced" tape during interrogation, an accurate laterally positioned tape during repeated successive runs through the guide mechanism, and at the same time insures maximum life of the tape.

While we have shown and described a particular embodiment of the present invention, it will be obvious to those skilled in the art that various changes and modifications may be made without departing from the present invention in its broader aspect and therefore it is the intention of the appended claims to cover all such changes and modifications as fall within the true spirit and scope of the present invention.

What we claim as new and desire to secure by Letters Patent of the United States is:

1. In a tape recorder a tape guide means comprising: a member having a surface over which a tape under tension passes while interrogating of the tape occurs by an interrogating means, said surface being directly opposite said interrogating means, fixed means toward which said member is biased, and means biasing said member toward each of said fixed means so that a tape passing between said member and said fixed means is maintained at a constant distance from said interrogating means.

2. A tape guide means as described in claim 1 further comprising means spaced from said fixed means about a part of which the tape also travels, means on said spaced means for transmitting a lateral force to one edge of the tape, and guide means on said spaced means against which the other of the tape edges is forced for positioning the tape as the tape edges is forced for positioning the tape as the tape passes about the spaced means.

3. A tape guide means as described in claim 1 wherein said member comprises a rotatably mounted transparent cylinder.

4. A tape guide means as described in claim 1 wherein said fixed means comprises a support at each of said locations, each of said supports having a pair of spaced rotatable bearings mounted thereon wherein said bearings engage the tape passing between said member and said bearings adjacent opposite lateral edges thereof whereby the information area on the tape is free from contact with said rotatable bearings.

5. A tape guide means as described in claim 1 wherein said biasing means comprises a spring loaded bearing engaging said member at a point removed from said fixed means.

6. In a tape recorder, a tape guide means comprising a rotatably mounted transparent cylinder having a surface over which a tape under tension passes while interrogation of the tape occurs, a pair of fixed spaced supports each having a pair of spaced rotatable bearings mounted thereon wherein said bearings engage the tape passing between said transparent cylinder and said bearing adjacent opposite lateral edges thereof whereby the information area on the tape is free from contact with said rotatable bearings, a spring loaded bearing engaging said transparent cylinder at a point removed from said rotatable bearings for biasing said transparent cylinder equally against each of said bearings, rollers mounted on either side of an interrogating means about a part of which the tape also travels, and a tape guide mounted on each of said rollers spring biased against one edge of the tape pushing the opposite edge thereof against a guide surface to thereby laterally position the tape.

References Cited by the Examiner

UNITED STATES PATENTS

| | | | |
|---|---|---|---|
| 1,614,214 | 1/1927 | Steiner | 179—100.3 |
| 2,668,059 | 2/1954 | Roberts | 226—183 X |
| 2,675,973 | 4/1954 | Reed et al. | 226—176 X |
| 3,115,314 | 12/1963 | Manley et al. | 226—176 X |
| 3,164,331 | 1/1965 | Hardy | 226—176 X |

FOREIGN PATENTS

| | | |
|---|---|---|
| 761,615 | 6/1953 | Germany. |

References Cited by the Applicant

UNITED STATES PATENTS

| | | |
|---|---|---|
| 23,192 | 1/1950 | Camras. |
| 2,603,425 | 7/1952 | Barbara et al. |
| 2,678,821 | 5/1954 | Masterson. |
| 2,914,266 | 11/1959 | Connell. |
| 2,996,583 | 8/1961 | Springer. |

M. HENSON WOOD, Jr., *Primary Examiner.*

J. N. ERLICH, *Assistant Examiner.*